United States Patent
Oguri

(10) Patent No.: US 10,592,823 B2
(45) Date of Patent: Mar. 17, 2020

(54) LEARNING MODEL CONSTRUCTION DEVICE, ABNORMALITY DETECTION DEVICE, ABNORMALITY DETECTION SYSTEM AND SERVER

(71) Applicant: FANUC CORPORATION, Yamanashi (JP)

(72) Inventor: Kenichiro Oguri, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 122 days.

(21) Appl. No.: 15/914,347

(22) Filed: Mar. 7, 2018

(65) Prior Publication Data
US 2018/0276569 A1     Sep. 27, 2018

(30) Foreign Application Priority Data
Mar. 22, 2017   (JP) .................................. 2017-055498

(51) Int. Cl.
*G06N 20/00*     (2019.01)
*G10L 15/22*     (2006.01)
(Continued)

(52) U.S. Cl.
CPC .............. *G06N 20/00* (2019.01); *G06N 3/08* (2013.01); *G10L 15/02* (2013.01); *G10L 15/063* (2013.01);
(Continued)

(58) Field of Classification Search
CPC ........ G06N 20/00; G06N 20/10; G06N 20/20; G06N 3/08; G06N 7/005; G10L 15/02;
(Continued)

(56) References Cited

U.S. PATENT DOCUMENTS

2016/0180678 A1*  6/2016  Ackley ............. H04M 1/72541
                                                        340/7.2
2017/0169687 A1*  6/2017  Kozloski ................ G08B 21/02
(Continued)

FOREIGN PATENT DOCUMENTS

CN     104392621     3/2015
CN     104536318     4/2015
(Continued)

OTHER PUBLICATIONS

Office Action dated Sep. 27, 2019 in Chinese Patent Application No. 201810224790.X.
(Continued)

*Primary Examiner* — Shane D Woolwine
(74) *Attorney, Agent, or Firm* — Wenderoth, Lind & Ponack, L.L.P.

(57) ABSTRACT

To provide a learning model construction device, abnormality detection device, abnormality detection system and server for performing abnormality detection using sound information of the surroundings of a production apparatus. A learning model construction device includes a voice acquisition unit that acquires voice data including the voice of an operator located in the vicinity of a production apparatus, via a mic; a label acquisition unit that acquires an abnormality degree related to a production line including the production apparatus as a label; and a learning unit that constructs a learning model for the abnormality degree, by performing supervised learning with a group of voice data and label as training data.

13 Claims, 7 Drawing Sheets

(51) Int. Cl.
*G10L 15/07* (2013.01)
*G06N 3/08* (2006.01)
*G10L 15/02* (2006.01)
*G10L 15/06* (2013.01)
*G06N 7/00* (2006.01)
*G10L 25/84* (2013.01)
*G10L 25/21* (2013.01)
*G06N 20/20* (2019.01)

(52) U.S. Cl.
CPC ............ G10L 15/075 (2013.01); G10L 15/22 (2013.01); *G06N 7/005* (2013.01); *G06N 20/20* (2019.01); *G10L 25/21* (2013.01); *G10L 25/84* (2013.01); *Y02P 90/02* (2015.11)

(58) Field of Classification Search
CPC ..... G10L 15/22; G10L 15/063; G10L 15/075; G10L 25/21; G06K 9/00718; G06K 9/00791; G06K 9/00805; G06K 9/00744; Y02P 90/02
USPC ...................................................... 706/12, 21
See application file for complete search history.

(56) References Cited

U.S. PATENT DOCUMENTS

2017/0221336 A1\* 8/2017 Ogaz .................. G08B 21/0423
2017/0249515 A1\* 8/2017 Bai ....................... G06N 3/0445

FOREIGN PATENT DOCUMENTS

| CN | 106409120 | 2/2017 |
|---|---|---|
| DE | 10 2014 012 184 | 2/2016 |
| JP | 6-4789 | 1/1994 |
| JP | 8-320251 | 12/1996 |
| JP | 2002-169611 | 6/2002 |
| JP | 2008-077160 | 4/2008 |
| JP | 2010-237781 | 10/2010 |
| JP | 2013-097713 | 5/2013 |
| JP | 2014-182092 | 9/2014 |
| JP | 2017-033526 | 2/2017 |

OTHER PUBLICATIONS

Office Action dated Oct. 7, 2019 in German Patent Application No. 10 2018 204 135.0.

\* cited by examiner

FIG. 3

TRAINING DATA 241

| FEATURE VALUE OF VOICE DATA | | | ABNORMALITY DEGREE OF PRODUCTION LINE |
|---|---|---|---|
| VOICE CONTENTS | VOLUME | TONE INTERVAL | |
| DANGER | LARGE | HIGH | 2 |
| DANGER | LARGE | LOW | 2 |
| DANGER | SMALL | HIGH | 1 |
| DANGER | SMALL | LOW | 1 |
| PAIN | LARGE | HIGH | 2 |
| ... | ... | ... | ... |
| STOP | LARGE | HIGH | 2 |
| ... | ... | ... | ... |
| KYAA | LARGE | HIGH | 2 |
| ... | ... | ... | ... |
| STRANGE | LARGE | HIGH | 1 |
| ... | ... | ... | ... |
| STRANGE | SMALL | LOW | 0 |
| ... | ... | ... | ... |
| WEIRD | LARGE | HIGH | 1 |
| ... | ... | ... | ... |
| PROBLEM | SMALL | LOW | 0 |
| (OTHER WORDS) | LARGE | HIGH | 0 |
| ... | ... | ... | ... |

LEARNING MODEL CONSTRUCTION DEVICE, ABNORMALITY DETECTION DEVICE, ABNORMALITY DETECTION SYSTEM AND SERVER

This application is based on and claims the benefit of priority from Japanese Patent Application No. 2017-055498, filed on 22 Mar. 2017, the content of which is incorporated herein by reference.

BACKGROUND OF THE INVENTION

Field of the Invention

The present invention relates to a learning model construction device, abnormality detection device, abnormality detection system and server.

Related Art

Conventionally, abnormality detection in a production apparatus is performed using information collected by sensors belonging to the production apparatus. For example, a production apparatus such as an industrial robot or machine tool driven by servomotor usually includes instruments such as an angle detector and electric current detector. In addition, the production apparatus includes various sensors such as a temperature sensor, torque sensor, force sensor, and touch sensor, depending on the use. Then, as abnormality detection using instruments and/or sensors, a method has been performed of detecting collisions according to external forces estimated from the electrical current value of the motor, and detecting abnormality in the reduction gears by frequency analyzing the estimated external force. In addition, it has been disclosed to perform abnormality detection of a production apparatus based on the detected vibrations and/or sounds of the production apparatus (for example, refer to Patent Documents 1 to 3).

Patent Document 1: Japanese Unexamined Patent Application, Publication No. 2002-169611

Patent Document 2: Japanese Unexamined Patent Application, Publication No. H08-320251

Patent Document 3: Japanese Unexamined Patent Application, Publication No. H06-4789

SUMMARY OF THE INVENTION

Herein, in the case of detecting abnormalities in a production apparatus or a production line to which the production apparatus belongs by collecting and analyzing sound, the sounds emanating from the production apparatus are collected and analyzed by way of the sensors belonging to the production apparatus. However, sounds indicating abnormality, and sounds including the symptoms of abnormality in a production line are not limited to those emanating from the production apparatus.

The present invention has been made taking account of such problems, and has an object of providing a learning model construction device, abnormality detection device, abnormality detection system and server for performing abnormality detection using sound information of the surroundings of the production apparatus.

A learning model construction device (e.g., the learning model construction device 200 described later) according to a first aspect of the present invention includes: a voice data acquisition unit (e.g., the voice acquisition unit 220 described later) for acquiring voice data including speech of an operator located in a vicinity of a production apparatus, via a voice receiving device (e.g., the mic 100 described later); a label acquisition unit (e.g., the label acquisition unit 230 described later) for acquiring an abnormality degree related to a production line including the production apparatus as a label; and a learning unit (e.g., the learning unit 240 described later) for constructing a learning model for abnormality degree, by way of performing supervised learning with a group of the voice data and the label as training data.

According to a second aspect of the present invention, in the learning model construction device as described in the first aspect, the voice data acquisition unit (e.g., the voice acquisition unit 220 described later) may acquire a feature value obtained from the speech of the operator as the voice data.

According to a third aspect of the present invention, in the learning model construction device as described in the second aspect, the feature value may be a value related to speech contents, tone interval and volume obtained by analyzing the speech of the operator.

According to a fourth aspect of the present invention, in the learning model construction device as described in any one of the first to third aspects, the voice receiving device (e.g., the mic 100 described later) may be wearable by the operator, and include: an operator position acquisition unit (e.g., the neighboring position determination unit 210 described later) for acquiring position information of the operator; and an apparatus position storage unit (e.g., the apparatus position storage unit 215 described later) that stores position information of the production apparatus, in which the voice data acquisition unit (e.g., the voice acquisition unit 220 described later) acquires the voice data in a case of the operator being located in a vicinity of the production apparatus, based on the position information of the operator acquired by the operator position acquisition unit and the position information of the production apparatus stored in the apparatus position storage unit.

According to a fifth aspect of the present invention, an abnormality detection device (e.g., the abnormality detection device 300, 2300 described later) configured using the learning model constructed by the learning model construction device (200) any one of the first to fourth aspects, includes: an abnormality degree determination unit (e.g., the abnormality degree determination unit 310 described later) for determining an abnormality degree relative to the voice data, based on the voice data acquired by the voice data acquisition unit (e.g., the voice acquisition unit 220 described later) and the learning model; and a notification unit (e.g., the notification unit 320 described later) for performing notification based on the abnormality degree determined by the abnormality degree determination unit.

According to a sixth aspect of the present invention, the abnormality detection device (e.g., the abnormality detection device 2300 described later) as described in the fifth aspect, may further include: a state information acquisition unit (e.g., the state data acquisition unit 2330 described later) for acquiring state information related to the production apparatus provided in the production line; and a state information output unit (e.g., the data output unit 2350 described later) for outputting the state information acquired by the state information acquisition unit, in a case of the abnormality degree determined by the abnormality degree determination unit (e.g., the abnormality degree determination unit 310 described later) indicating an abnormality.

According to a seventh aspect of the present invention, in the abnormality detection device as described in the sixth aspect, the state information may include at least any one of image information, oscillation information and temperature information.

According to an eighth aspect of the present invention, the abnormality detection device (e.g., the abnormality detection device 2300 described later) as described in any one of the fifth to seventh aspects may further include: an operating information acquisition unit (e.g., the operating data acquisition unit 2340 described later) for acquiring operating information of the production apparatus; and an operating information output unit (e.g., the data output unit 2350 described later) for outputting the operating information acquired by the operating information acquisition unit (2340), in a case of the abnormality degree determined by the abnormality degree determination unit (e.g., the abnormality degree determination unit 310 described later) indicating an abnormality.

According to a ninth aspect of the present invention, in the abnormality detection device as described in the eighth aspect, the operating data may include measurement data that was measured by a sensor installed in the production apparatus.

An abnormality detection system (e.g., the abnormality detection system 1000, 1000-2 described later) according to a tenth aspect of the present invention includes: the learning model construction device (e.g., the learning model construction device 200 described later) as described in any one of the first to fourth aspects; and the abnormality detection device (e.g., the abnormality detection device 300, 2300 described later) as described in any one of the fifth to ninth aspects.

According to an eleventh aspect of the present invention, in the abnormality detection system as described in the tenth aspect, the learning model construction device and the abnormality detection device may be provided to the production apparatus.

According to a twelfth aspect of the present invention, a server having a plurality of the learning model construction devices (e.g., the learning model construction device 200 described later) as described in any one of the first to fourth aspects, and connected to the plurality of the learning model construction devices via a communication network (e.g., the network 500 described later), includes: a data transmission unit for receiving training data consisting of a group of the voice data acquired by the voice data acquisition unit and the label acquired by the label acquisition unit of one of the learning model construction devices, and for sending the training data received to another of the learning model construction devices.

According to a thirteenth aspect of the present invention, a server having a plurality of the learning model construction devices (e.g., the learning model construction device 200 described later) as described in any one of the first to fourth aspects, and connected to the plurality of the learning model construction devices via a communication network (e.g., the network 500 described later), includes: a data receiving unit for receiving training data consisting of a group of the voice data acquired by the voice data acquisition unit and the label acquired by the label acquisition unit of each of the learning model construction devices; a learning unit for constructing a learning model for abnormality degree, by way of performing supervised learning using the training data received by the data receiving unit; and a model sending unit for sending the learning model constructed by the learning unit to each of the learning model construction devices.

According to the present invention, it is possible to provide a learning model construction device, abnormality detection device, abnormality detection system and server for performing abnormality detection using sound information of the surroundings of a production apparatus.

BRIEF DESCRIPTION OF THE DRAWINGS

FIG. 3 is a table showing examples of training data in a first embodiment of the present invention;

DETAILED DESCRIPTION OF THE INVENTION

First Embodiment

First, an outline of an embodiment of the present invention will be explained. The present embodiment relates to a system for determining an abnormality degree in a production line having at least one production apparatus, based on the speech generated by each operator performing work in the vicinity of the production apparatus such as a robot, machine tool and injection molding machine.

Each operator, upon monitoring the production apparatuses in the vicinity of the production apparatus, will say something such as "dangerous" or "stop", in the case of confirming a hazardous situation, for example. In addition, a shout like a scream of "kyaa" or the like is also included in the sound made by each operator under a hazardous situation. Therefore, the present embodiment performs machine learning with voice data that is sound generated by operators monitoring the production line as the input data. Then, the present embodiment detects a case of the production line being abnormal according to the speech generated by the operator, by using a learning model that is the result data made by machine learning. The above is an outline of an embodiment of the present invention.

Figure 1:
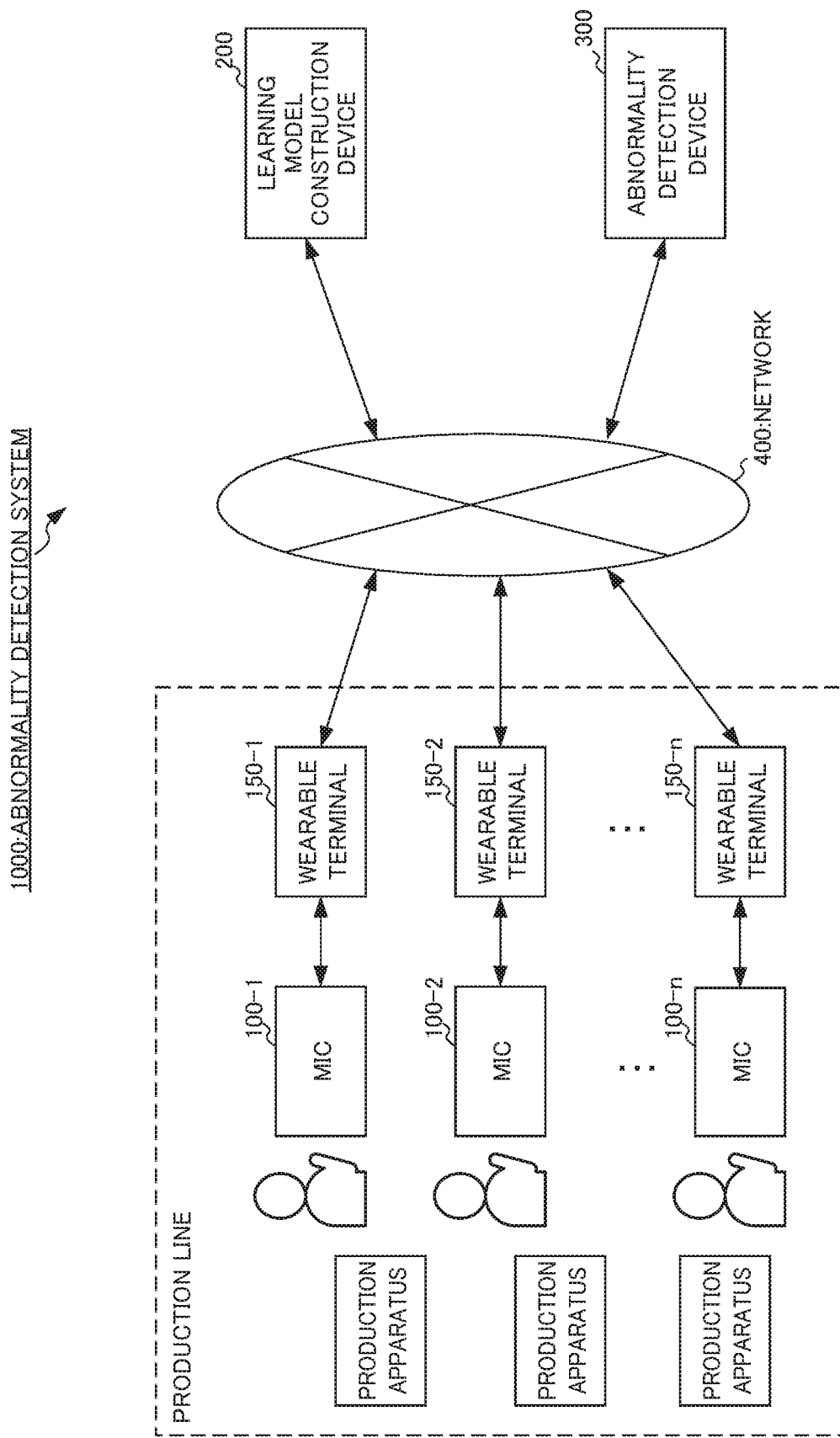
FIG. 1 is a block diagram showing the basic configuration of an overall embodiment of the present invention.

Next, an explanation will be made for the configuration of an abnormality detection system 1000 that is the present embodiment by referencing FIG. 1. As shown in FIG. 1, the abnormality detection system 1000 includes n-number of mics 100, n-number of wearable terminals 150, a learning model construction device 200, an abnormality detection device 300 and a network 400. It should be noted that n is any natural number.

The connections between these devices will be explained. The mic 100 and wearable terminal 150 are possessed by each operator, and the mic 100 is communicably connected to the wearable terminal 150 by way of short-distance wireless communication such as Bluetooth (registered trademark) or the like, for example. Then, the wearable terminal 150 is communicably connected to the network 400.

The learning model construction device 200 and abnormality detection device 300 are respectively connected to the network 400, and are able to perform communication mutually via the network 400. The network 400, for example, is a LAN (Local Area Network) constructed within a factory, Internet, public telephone network, or a combination of these. The specific communication system of the network 400, whether being a wired connection or wireless connection, etc., is not particularly limited.

Figure 2:
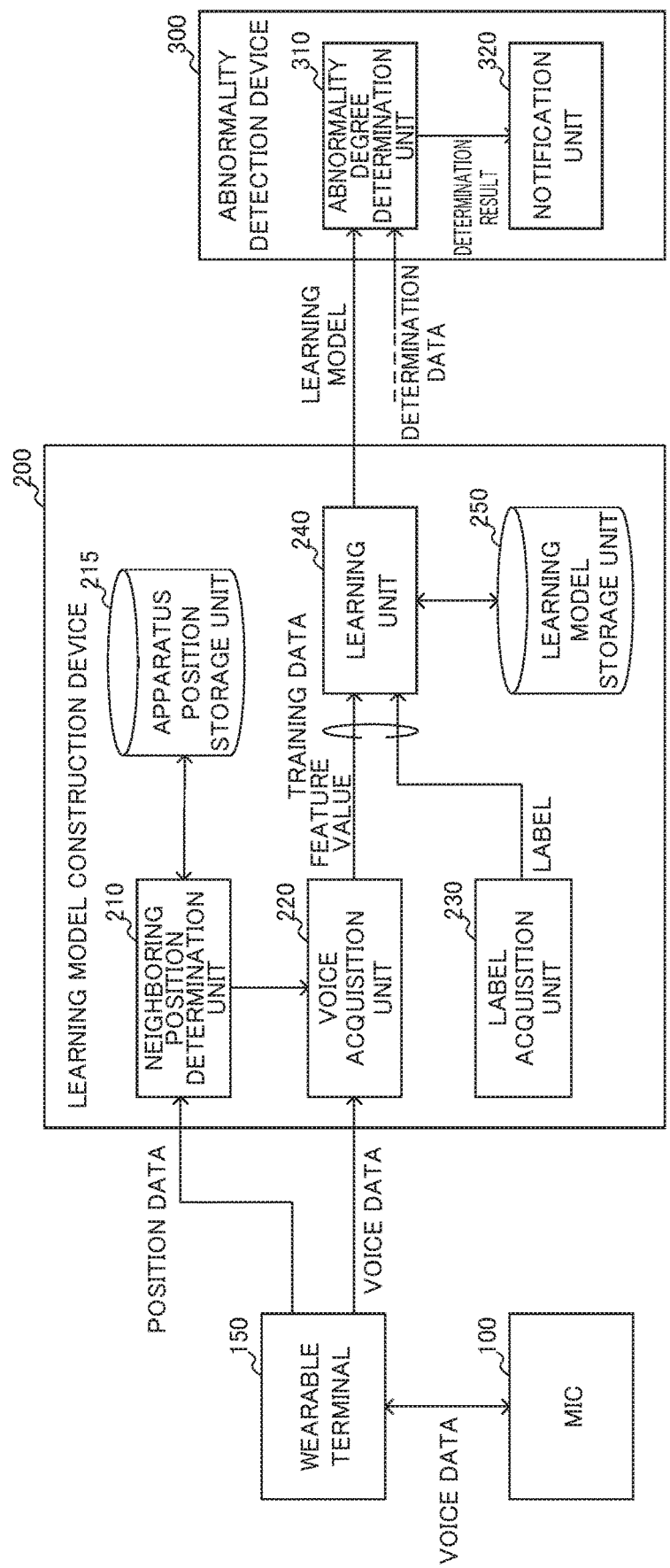
FIG. 2 is a block diagram showing functional blocks included in each device of a first embodiment of the present invention.

Next, an explanation will be made for the functions of these devices included in the abnormality detection system 1000 by referencing FIG. 2. Herein, FIG. 2 is a block diagram showing the functional blocks included in each device. It should be noted that, since the mics 100-1 to 100-$n$ have equivalent functions, and the wearable terminals 150-1 to 150-$n$ have equivalent functions, only one thereof is illustrated in FIG. 2, respectively. In addition, illustration is omitted for the network 400 existing between the respective devices.

The mic 100, for example, is the sound collection part of a headset that the operator wears on the head, and is a voice pick-up device that picks up the speech of the operator. The wearable terminal 150 is a portable terminal worn by the operator. The wearable terminal 150 has a role of sending voice data picked up by the mic 100 to the learning model construction device 200, and a role for acquiring position information of the operator. The mic 100 includes common functional blocks such as a functional block for controlling the mic 100, and a function for performing communication. Similarly, the wearable terminal 150 includes common functional blocks such as a functional block for controlling the wearable terminal 150, and a functional block for performing communication. Since the common functional blocks of these are well known to those skilled in the art, illustration and explanation thereof will be omitted. Similarly, for the common functional blocks in a learning model construction device 200 and abnormality detection device 300 described later, such as a functional block for performing communication and a functional block for accepting manipulations from an operator, illustration and explanation will be omitted.

The learning model construction device 200 is a device that performs machine learning using voice data received by the mic 100. Then, the learning model construction device 200 constructs a learning model for performing abnormality detection, by performing machine learning. The learning model construction device 200 includes a neighboring position determination unit 210, apparatus position storage unit 215, voice acquisition unit 220, label acquisition unit 230, learning unit 240, and learning model storage unit 250.

The neighboring position determination unit 210 specifies the position of the operator. Then, the neighboring position determination unit 210 determines whether the specified position of the operator is in the vicinity of the production apparatus. Herein, as the method of acquiring the position information of the operator, it is possible to employ well-known technology. For example, each of a plurality (e.g., 4) of wireless base stations (not illustrated) receiving radio waves sent from the wearable terminal 150 sends the radio-wave arrival time at which arriving at each wireless base station to the neighboring position determination unit 210. Then, the neighboring position determination unit 210 specifies the position of the wearable terminal 150 based on 3-point measurements from the differences in radio-wave arrival times at which arriving at the receiving respective wireless base stations (time difference of arrival method). Then, the neighboring position determination unit 210 acquires operator identification information corresponding to the wearable terminal 150, along with the specified position information.

In addition, the wireless base station having received the radio waves sent from the wearable terminal 150 sends the intensity of the received radio waves to the neighboring position determination unit 210. Then, the neighboring position determination unit 210 specifies the position of the wearable terminal 150 based on the intensity of the received radio waves, radio-wave intensity map acquired beforehand, or 3-point measurements (received signal strength indication method). Then, the neighboring position determination unit 210 acquires the operator identification information for identifying the operator corresponding to the wearable terminal 150, along with the specified position information.

Furthermore, as a method of acquiring the position information of the operator, a beacon method may be applied. In this case, the operator carries a beacon in addition to the wearable terminal 150, or it is configured so as to have a beacon function in the wearable terminal 150 carried by the operator. Then, by a beacon unit (not illustrated) installed in the production line receiving radio waves, infrared rays, or the like emitted from the beacon, the operator identification information corresponding to the beacon is acquired, as well as measuring the position of the operator. Then, the neighboring position determination unit 210 acquires the position information of the operator from the beacon unit. It should be noted that RFID (Radio Frequency Identification), Bluetooth (registered trademark), or the like can be exemplified as the beacon and beacon unit, for example.

In this way, the learning model construction device 200 can detect the position information of the operator within the production line, along with the operator identification information, by including a well-known function of position detection. It should be noted that, separately from the learning model construction device 200, it may be configured so as to include a position detection system having a well-known function of position detection, and the position detection system sends the acquired position information of the operator to the learning model construction device 200.

Next, the neighboring position determination unit 210 determines whether the position of the operator is in the vicinity of the production apparatus, based on the acquired position information of the operator, operator identification information, and position information of the production apparatus stored in the apparatus position storage unit 215. For example, if the difference between the position of the operator and the position of the nearest production apparatus to the position of the operator is within 10 m, the neighboring position determination unit 210 determines that the position of the operator is in the vicinity of the production apparatus.

The voice acquisition unit 220 is a portion that acquires voice data via the wearable terminal 150 from the mic 100 (hereinafter simplified and referred to as "acquire voice data from mic 100"), and generates input data for learning by extracting feature values from the acquired voice data. Herein, the voice acquisition unit 220 extracts feature values from the voice data in the case of being determined that the operator is located in the vicinity of the production apparatus by way of the neighboring position determination unit 210. First, the voice acquisition unit 220 analyzes the voice data acquired from the mic 100, and specifies the voice data as the target of speech recognition. More specifically, first, voice data is captured every predetermined section, the amplitudes values of the voice data are integrated at a predetermined sampling time, this integrated amount is compared with that of a previous section, and a section in which the difference exceeds a threshold for speech recognition start is defined as the speech recognition start section. Then, a series of a plurality of sections from the speech recognition start section is defined as a speech input section, and voice data acquired in this speech input section is specified as the voice data of a processing target. Then, the voice acquisition unit 220 applies a predetermined speech recognition algorithm to the specified voice data to extract feature values. For example, in the case of using HMM (Hidden Markov Model) as the speech recognition algorithm, the voice acquisition unit 220 extracts mel-cepstrum, the dynamic feature value of this mel-cepstrum (variation in time region of mel-cepstrum), dynamic feature value of log power, etc., by way of mel-cepstrum analysis, as the feature values.

Furthermore, the voice acquisition unit 220 performs speech recognition processing based on the extraction results, and can recognize the speech content of an operator included in the voice data. Then, the voice acquisition unit 220 extracts words as feature values of voice by way of morphological analysis or the like, from the recognized speech contents. It should be noted that the speech recognition processing can be performed using various well-known techniques. Herein, prior to performing speech recognition, the voice acquisition unit 220 extracts only voice data having a frequency similar to the voice to serve as the recognition target, by performing frequency analysis using FFT (Fast Fourier Transform) or the like on the voice data, for example. By configuring in this way, it is possible to make so that voice data consisting of only noises not including the speech of the operator will not to be used in machine learning. Then, the voice acquisition unit 220 recognizes the tone interval and/or volume from the waveform.

The label acquisition unit 230 accepts an input operation of a label from a monitoring person, thereby acquiring a label, by way of an operation accepting unit (not illustrated) of the learning model construction device 200. Herein, label is the correct output that should correspond to the input in machine learning. In the present embodiment, the label relates to the abnormality degree of the production line. More specifically, the label is the extent in three stages in which the abnormality degree is from 0 to 2. Herein, the abnormality degree of 0 indicates an abnormal state not arising, i.e. being normal. In addition, the abnormality degree of 1 indicates an abnormality extent of a caution level, and the abnormality degree of 2 indicates an abnormality extent of a warning level. Extent of caution level refers to a label validating the production line, and extent of warning level refers to a level stopping the production line, for example.

By configuring in this way, the feature value of the voice data of the operator serving as the learning target, and the label of abnormality degree in the production line become a group, and are inputted to the learning unit 240. This group of feature value and label correspond to teaching data of machine learning. FIG. 3 is a table showing an example of teaching data 241 inputted to the learning unit 240.

Herein, it is desirable for a several sets of teaching data for performing machine learning to be prepared. Therefore, for example, in practice, upon acquiring the voice data of the operator upon an abnormality occurring while the production apparatus is running, and accumulating the acquired voice data, the voice data from each operator may be acquired for each of a plurality of production lines. By configuring in this way, it is good because it is possible to create many sets of teaching data, from the voice data acquired from the mics 100 being used by the operators normally. In addition, a rehearsal assuming to be during abnormality may be done, and voice data of the operator during this time may be acquired.

The learning unit 240 constructs a learning model for the abnormality degree of the production line by performing machine learning based on the training data inputted in this way. The learning model constructed by the learning unit 240 is outputted to the learning model storage unit 250 and an abnormality detection device 300 described later.

The learning model storage unit 250 is a storage unit that stores learning models outputted to the learning model storage unit 250 by way of learning by the learning unit 240. The learning models stored by the learning model storage unit 250 are used by the abnormality detection device 300. It should be noted that, after constructing the learning model, in the case of acquiring new teaching data, it may be configured so as to update a learning model already constructed, by performing further supervised learning on the learning model stored by the learning model storage unit 250. In addition, it may be configured so as to share a learning model stored by the learning model storage unit 250 with other learning model construction devices 200. If configuring so as to share learning models with a plurality of learning model construction devices 200, since it becomes possible to distribute between a plurality of the learning model construction devices 200 and perform further supervised learning, the efficiency and accuracy of supervised learning can be improved.

The abnormality detection device 300 is a device that detects an abnormality of the production line in the present embodiment. The abnormality detection device 300 includes an abnormality degree determination unit 310 and notification unit 320. The abnormality degree determination unit 310 determines the abnormality degree relative to determination data, using the learning model inputted from the learning unit 240, and determination data inputted from outside. Then, the abnormality degree determination unit 310, in the case of the abnormality degree indicating an abnormality as a result of the determination performed using these sets of data, notifies to the notification unit 320.

Herein, the learning model inputted from the learning unit 240 to the abnormality degree determination unit 310 is constructed by the learning unit 240 as mentioned above. In addition, the determination data inputted to the abnormality degree determination unit 310 is data equivalent to the feature values inputted to the learning unit 240. It may be configured so that the determination data is inputted from the voice acquisition unit 220 of the learning model construction device 200. In addition, it may be configured so as to provide functional blocks equivalent to the neighboring position determination unit 210 and voice acquisition unit 220 inside of the abnormality detection device 300, in which this functional block equivalent to the neighboring position determination unit 210 determines whether the operator is located in the vicinity of the production apparatus from the position information acquired from the wearable terminal 150, and this functional block equivalent to the voice acquisition unit 220 extracts feature values from the voice data acquired from the mic 100.

The notification unit 320 is a portion that outputs based on the determination results inputted from the abnormality degree determination unit 310. The notification unit 320 notifies by illuminating a warning lamp, or outputting an alarm sound, for example, according to the abnormality degree outputted as the determination result. Another operator or monitoring person excluding the operator who produced the speech can know that some kind of abnormality occurred in the production line by way of the notification by the notification unit 320.

The functional blocks of the mic 100, wearable terminal 150, learning model construction device 200 and abnormality detection device 300 have been explained above. Next, explanations will be made for the implementation methods for these functional blocks. In order to realize these functional blocks, all of the wearable terminal 150, learning model construction device 200 and abnormality detection device 300 include an arithmetic processing unit such as a CPU (Central Processing Unit). In addition, all of the wearable terminal 150, learning model construction device 200 and abnormality detection device 300 include an auxiliary storage device such as a HDD (Hard Disk Drive) storing various control programs such as application software and the OS (Operating System), and a main storage device such as RAM (Random Access Memory) for storing data that is necessitated temporarily upon the arithmetic processing unit executing programs.

Then, in each device, the arithmetic processing unit reads out the application and/or OS from the auxiliary storage device, and performs arithmetic processing based on this application and/or OS, while expanding the read application and/or OS in the main storage device. In addition, based on these computation results, the various hardware possessed by the respective devices is controlled. The functional blocks of the present embodiment are thereby realized. In other words, the present embodiment can be realized by hardware and software cooperating. As a specific example, the wearable terminal 150 may be realized by a smartphone, portable terminal or the like other than a wearable terminal, for example. In addition, the learning model construction device 200 and abnormality detection device 300 may be realized by a computer such as a personal computer or server, for example.

However, since the computation amount increases accompanying machine learning for the learning model construction device 200, for example, if configured so as to install GPUs (Graphics Processing Units) to a personal computer, and use the GPUs in the arithmetic processing accompanying machine learning, according to a technique called GPGPU (General-Purpose computing on Graphics Processing Units), it is good because high-speed processing becomes possible. Furthermore, in order to perform higher-speed processing, it may be configured to construct a computer cluster using a plurality of computers equipped with such GPUs, and perform parallel processing with the plurality of computers included in this computer cluster.

Figure 4:
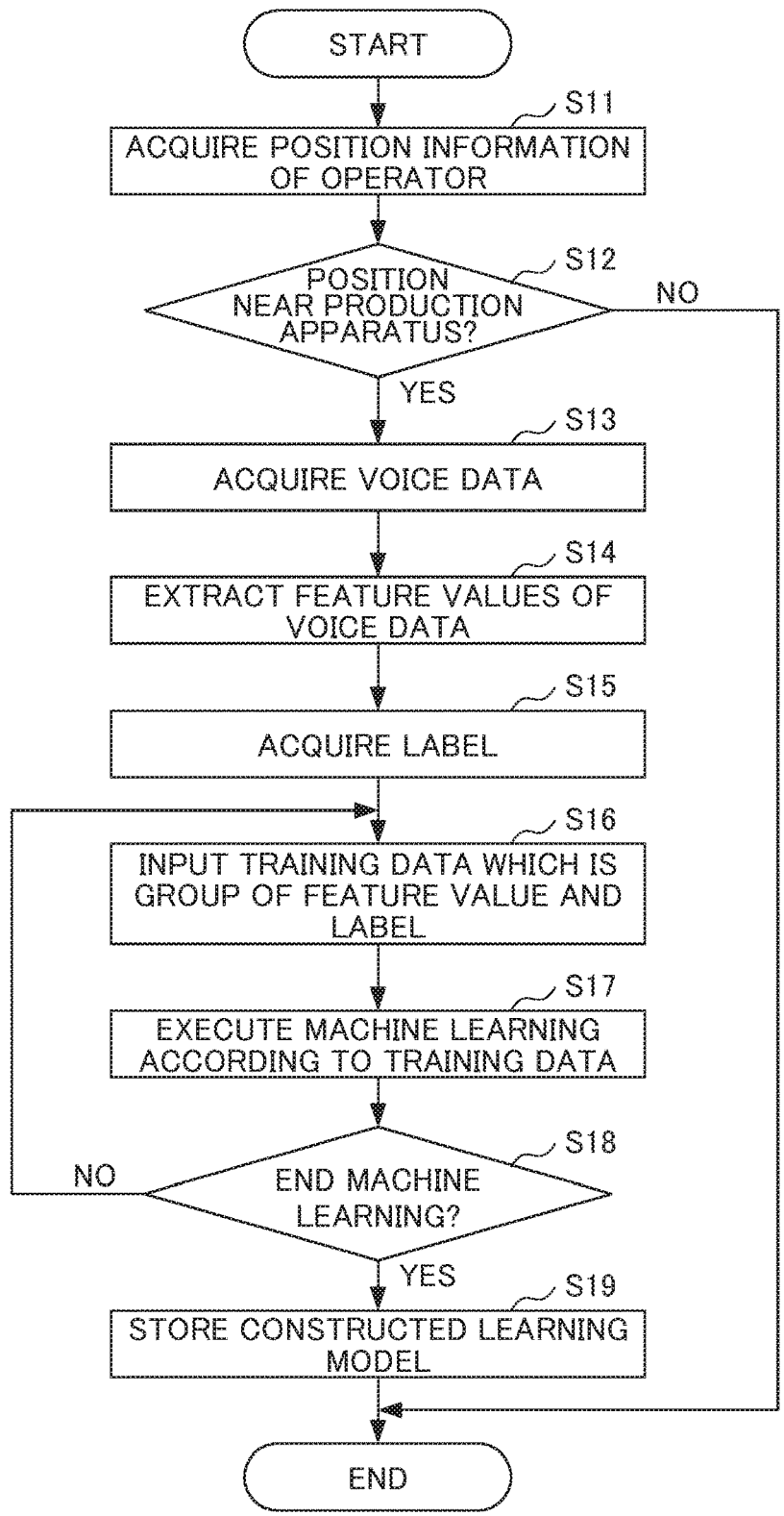
FIG. 4 is a flowchart showing operations during machine learning in the first embodiment of the present invention.

Next, an explanation will be made for operations of the learning model construction device 200 during machine learning, by referencing the flowchart of FIG. 4. In Step (hereinafter simply referred to as "S") S11 in FIG. 4, the neighboring position determination unit 210 of the learning model construction device 200 acquires position information of the wearable device 150 carried by the operator, as position information of the operator. In S12, the neighboring position determination unit 210 references the apparatus position storage unit 215, and determines whether the acquired position information is a position near the position information of any production apparatus stored in the apparatus position storage unit 215. In the case of being at a near position (S12: YES), the neighboring position determination unit 210 advances the processing to S13. Otherwise, in the case of not being a near position (S12: NO), the neighboring position determination unit 210 ends the current processing.

In other words, in the case of the operator not being at a position near the production apparatus, it is considered that the operator is not talking about the production apparatus, and does not include speech related to the production line. For this reason, in the case of the operator not being at a position near the production apparatus, the speech uttered by the operator is not made the learning target in the learning model construction device 200.

In S13, the voice acquisition unit 220 acquires voice data via the mic 100. In S14, the voice acquisition unit 220 extracts feature values from the voice data acquired in S13. The feature values to extract herein can be set as the length uttering each word, among the speech of the operator, for example. In other words, in the feature values extracted from the voice data, a portion including the speech of the operator in which this speech produced a word is defined as the feature value of training data. In S15, the label acquisition unit 230 acquires a label. In S16, training data establishing the feature value extracted in S14 and the label acquired in S15 as a group is inputted to the learning unit 240.

In S17, the learning unit 240 executes machine learning using the inputted training data. In the present embodiment, supervised learning is performed by a neural network constituted by joining perceptrons. More specifically, the learning unit 240 provides the group of a feature value and label which is the input data included in the training data to the neural network, and changes the weighting for each perceptron included in the neural network so that the output of the neural network becomes the same as the label. By configuring in this way, the learning unit 240 learns the characteristics of training data, and recursively attains a learning model for estimating a result from inputs.

In S18, the learning unit 240 determines to end the supervised learning, or to repeat the supervised learning. Herein, it is possible to arbitrarily decide the conditions to end supervised learning. For example, it is good to configure so as to end supervised learning in the case of the value of the error between the output of the neural network and the label becoming no more than a predetermined value. In addition, alternatively, it may be configured so as to end supervised learning in the case of having repeated supervised learning by only a number of times decided in advance. In either way, in the case the condition not being satisfied, and still not ending supervised learning (S18: NO), the learning unit 240 advances the processing to S16, and repeats supervised learning again with new training data or the same training data as the target. On the other hand, in the case of the condition for ending supervised learning being satisfied in the course of repeating supervised learning (S18: YES), the learning unit 240 ends the supervised learning.

In S19, the learning unit 240 causes the learning model constructed by way of supervised learning up until this moment to be outputted and stored in the learning model storage unit 250. If stored in the learning model storage unit 250 in this way, in the case of the learning model being requested from a newly installed abnormality detection device 300, the learning model construction device 200 can send the learning model. In addition, in the case of acquiring new training data, the learning model construction device 200 can perform further machine learning on the learning model. Subsequently, the learning model construction device 200 ends the present processing.

It should be noted that the aforementioned flowchart explains determining whether the position of the operator is a position near the production apparatus, and in the case of being a position near the production apparatus, acquiring voice data and extracting feature values. However, the processing of acquiring the position information of the operator and determining whether the operator is at a position near the production apparatus may be performed after acquisition of the voice data, or may be performed simultaneously with the acquisition of voice data. In addition, it may be simultaneous with the processing of extracting feature values from the voice data, or may perform processing related to the position of the operator after extracting feature values. In other words, so long as configured so that the voice data to input to the learning unit 240 is speech uttered by the operator at a position near the production apparatus, the processing may be performed in either sequence.

According to the operations explained above, the learning model construction device 200 exerts an effect in being able to construct a learning model for the abnormality degree of a production line using the voice data of an operator.

The aforementioned supervised learning may be performed by on-line learning, may be performed by batch learning, or may be performed by mini-batch learning. On-line learning is a learning method of extracting feature values from the voice data, and performing supervised learning immediately every time a label is inputted and training data is created. In addition, batch learning is a learning method of extracting feature values from voice data and, while labels are repeatedly inputted and training data is created, collecting a plurality of sets of training data in response to the repetition, and performing supervised learning using all of the collected training data. Furthermore, mini-batch learning is a learning method between on-line learning and batch learning of performing supervised learning each time a certain amount of training data accumulates.

An explanation has been made above for the construction of a learning model by the learning model construction device 200. Next, an explanation will be made for abnormality detection in the abnormality detection device 300 using the learning model constructed in this way, by referencing the flowchart of FIG. 5.

Figure 5:
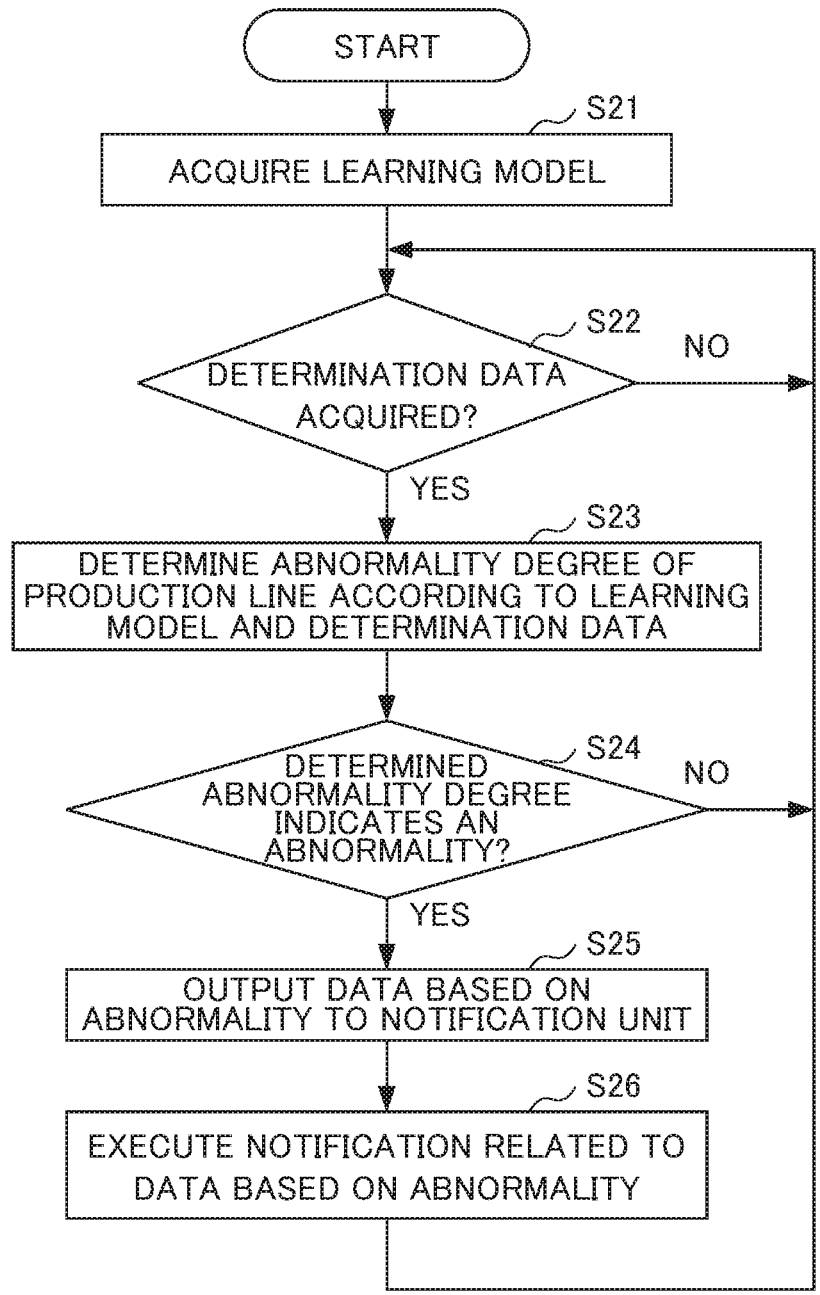
FIG. 5 is a flowchart showing operations during abnormality detection in the first embodiment of the present invention.

In S21 of FIG. 5, the abnormality degree determination unit 310 of the abnormality detection device 300 acquires a learning model by receiving the learning model sent by the learning model construction device 200. In S22, the abnormality degree determination unit 310 determines whether determination data has been acquired from the voice acquisition unit 220. It should be noted that the details of the acquisition method for determination data are as mentioned above during the explanation for the abnormality degree determination unit 310 made referencing FIG. 2. In the case of having acquired determination data from the voice acquisition unit 220 (S22: YES), the abnormality degree determination unit 310 advances the processing to S23. On the other hand, in the case of not having acquired determination data from the voice acquisition unit 220 (S22: NO), the abnormality degree determination unit 310 stands by until acquiring the determination data.

In S23, the abnormality degree determination unit 310 performs determination of the abnormality degree according to the acquired learning model and acquired determination data. More specifically, the abnormality degree relative to the determination data is determined based on the feature values included in the acquired determination data, and the learning model acquired in S21. It should be noted that the abnormality detection device 300 also must take into account a case of a plurality of operators producing speech at the same time. For example, a case of a plurality of operators discovering an abnormality in the production apparatus and producing speech is considered. In such a case, although it will come to acquire a plurality of sets of determination data, the abnormality degree determination unit 310 may determine the abnormality degree relative to each set of determination data in this case, and then set the abnormality degree of the highest extent as the abnormality degree at this moment.

In S24, the abnormality degree determination unit 310 judges whether the determined abnormality degree is indicating an abnormality. A case of the determined abnormality degree indicating an abnormality refers to a case of the abnormality degree being 2 (warning level) or 1 (caution level), according to the aforementioned example. In the case of the abnormality degree indicating an abnormality (S24: YES), the abnormality degree determination unit 310 advances the processing to S25. On the other hand, in the case of the abnormality degree not indicating an abnormality (S24: NO), the abnormality degree determination unit 310 advances the processing to S22 due to not performing the succeeding processing related to this determination data.

In S25, the abnormality degree determination unit 310 outputs data based on the abnormality degree to the notification unit 320. Data based on the abnormality degree refers to data indicating caution, or data indicating a warning, for example, and if the abnormality degree is 1, data indicating caution is outputted, and if the abnormality degree is 2, data indicating a warning is outputted. In S26, the notification unit 320 performs notification corresponding to the data based on the abnormality degree. For example, in the case of being data indicating caution, the notification unit 320 causes a warning lamp to be illuminated. In addition, in the case of being data indicating a warning, for example, the notification unit 320 causes the warning lamp to be illuminated, and further outputs an alarm sound. Subsequently, the abnormality detection device 300 advances the processing to S22, and stands by until the next determination data is acquired.

The present embodiment explained above exerts an effect in that another operator or monitoring person can know of an abnormality in the production line according to the output by the notification unit 320. Then, by performing association between the speech produced by the operator and the abnormality of the production line, it is possible to improve the safety of the production apparatus and operators on the production line.

Second Embodiment

Next, a second embodiment will be explained. Further to the first embodiment, in the second embodiment, the abnormality detection device outputs state data related to the production line and operating data of the production apparatus, in the case of the abnormality degree determined by the abnormality detection device indicating an abnormality.

Figure 6:
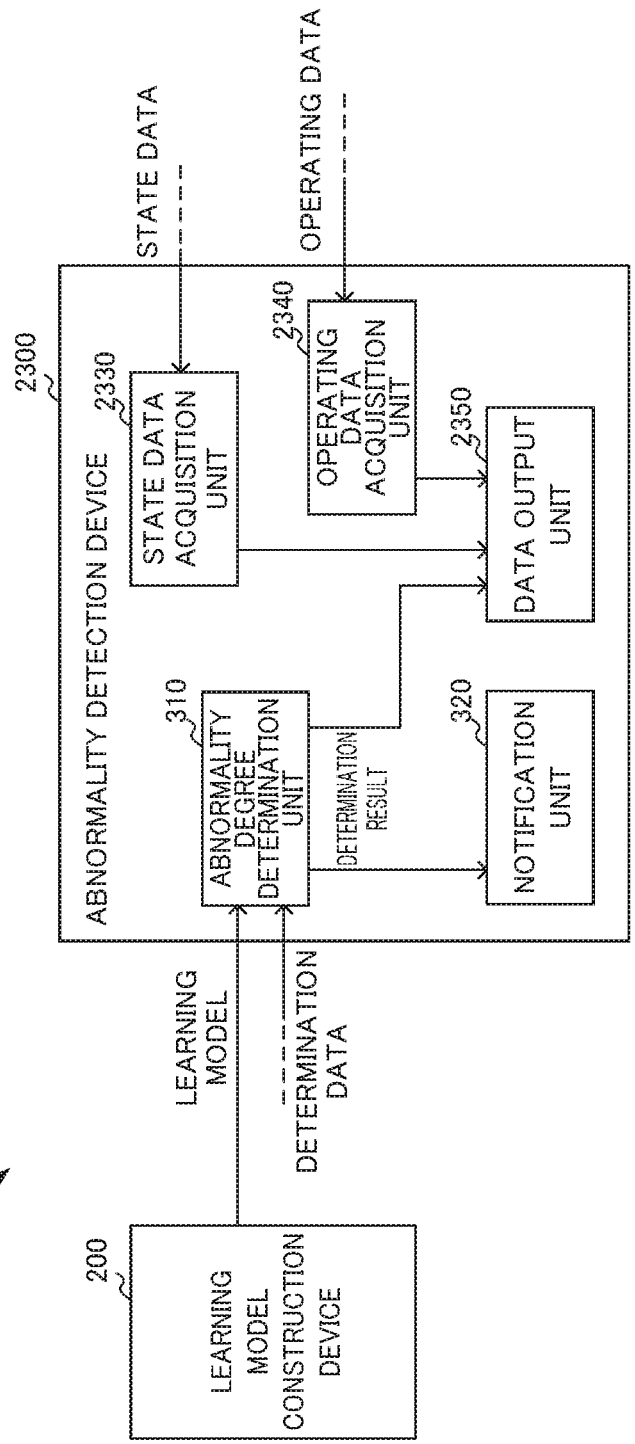
FIG. 6 is a block diagram showing functional blocks included in an abnormality detection device of a second embodiment of the present invention.

Configurations of an abnormality detection system 1000-2 which is the present embodiment are the same as those shown in FIG. 1, except for the point of being an abnormality detection device 2300 in place of the abnormality detection device 300. The abnormality detection device 2300 of the abnormality detection system 1000-2 will be explained based on FIG. 6.

The abnormality detection device 2300 is a device which detects abnormality in the production line of the present embodiment. The abnormality detection device 2300 includes a state data acquisition unit 2330, operating data acquisition unit 2340 and data output unit 2350, in addition to the abnormality degree determination unit 310 and notification unit 320.

The state data acquisition unit 2330 acquires state data from instruments for confirming the state related to the production line such as a camera, seismograph and thermometer installed to the production line at which the operator is present, which was acquired as determination data. The state data is image data in the case of being a camera, is oscillation data in the case of being a seismograph, and is temperature data in the case of being a thermometer. The state data acquisition unit 2330 may always acquire state data from each instrument. In addition, the state data acquisition unit 2330, in the case of acquiring determination data, may acquire state data from each instrument from a time a predetermined time earlier than the timing at which to acquire the determination data.

The operating data acquisition unit 2340 acquires the operating data from the production apparatus in the production line in which the operator is present, which was acquired as determination data. The operating data includes measurement data produced by sensors installed in the production apparatus measuring. More specifically, in the case of the production apparatus being an injection molding machine, the operating data is the electric current value and angle information collected at the motor of the injection molding machine. The operating data acquisition unit 2340 may always acquire operating data from each production apparatus, or may acquire operating data from each production apparatus in the case of acquiring determination data.

The data output unit 2350 outputs state data acquired by the state data acquisition unit 2330 and operating data acquired by the operating data acquisition unit 2340, based on the determination result inputted from the abnormality degree determination unit 310. The output may be a monitoring screen (not illustrated) which is monitored by the monitoring person, or may be a display device (not illustrated) such as a display equipped to the production apparatus.

By equipping such a configuration, the abnormality detection device 2300 outputs the state data and/or operating data in the case of the abnormality degree determined according to the determination data indicating an abnormality. Consequently, the operator and/or monitoring person can confirm the state of the production line and/or operating state of production apparatuses, along with the matter of an abnormality occurring in the production line. As a result thereof, it is possible to easily and at an early stage obtain information for investigating the cause in the case of being determined as an abnormality.

Modified Examples

The aforementioned embodiments are a preferred embodiments of the present invention; however, they are not to limit the scope of the present invention to only the above-mentioned embodiments, and implementation is possible in modes arrived at by conducting various modifications within a scope not departing form the gist of the present invention.

For example, in the aforementioned embodiments, feature values are extracted from voice data received by the mic 100. Then, training data is created by the extracted feature values and labels. In addition thereto, it may be configured so as to include the state data and/or operating data acquired in the second embodiment, in the training data. For example, it may be configured so as to include temperature data measured by a thermometer, or oscillation data measured by a seismograph, in the training data as one of the feature values. In addition, it may be configured so as to extract the feature value from the measurement data measured by a sensor installed in the production apparatus, and include the feature value of the measurement data in the training data. By configuring in this way, the data required in learning can be made into various types of data, and the precision of abnormality detection can be raised.

In addition, the aforementioned embodiments explain examples in which the learning model construction device 200 performs supervised learning by way of a neural network. However, it may be configured to use another pattern recognition model, and perform learning using an algorithm of other machine learning. For example, it may be a configuration such that dynamically creates tables for explaining the training data 241 shown in FIG. 3 by way of learning.

In addition, in the aforementioned embodiment, the abnormality detection device 300 performs notification by way of the notification unit 320, in the case of the abnormality degree determined by the abnormality degree determination unit 310 indicating an abnormality. In addition thereto, it may be configured so as to output to the production apparatus a signal causing the production apparatus to emergency stop in response to the abnormality degree, in the case of the abnormality degree indicating an abnormality. Then, in the case of the production apparatus receiving the signal causing to emergency stop, a security processing unit equipped to the production apparatus causes the apparatus to emergency stop. By configuring in this way, particularly in the case of being an abnormality concerned with life, it is possible to improve the safety of operators.

In addition, the aforementioned embodiments collect the speech of the operator from the mic 100 carried by the operator, and acquire position data of the operator using the wearable terminal 150. However, in the case of the mic 100 itself having a function as a wearable terminal, the wearable terminal 150 will be unnecessary. Furthermore, in place of the mic 100, it may be configured so as to collect the speech of the operator from a mic provided to each production apparatus and collecting sounds in the vicinity of the production apparatus. On this occasion, for example, it may be configured so as to acquire the voice data in the range of frequency of the human voice, using a low-pass filter attenuating components in a frequency band no more than a predetermined frequency, for example. By collecting sound from a mic provided to the production apparatus in this way, since processing for determining whether or not an operator is located near the production apparatus becomes unnecessary, the processing efficiency rises.

Figure 7:
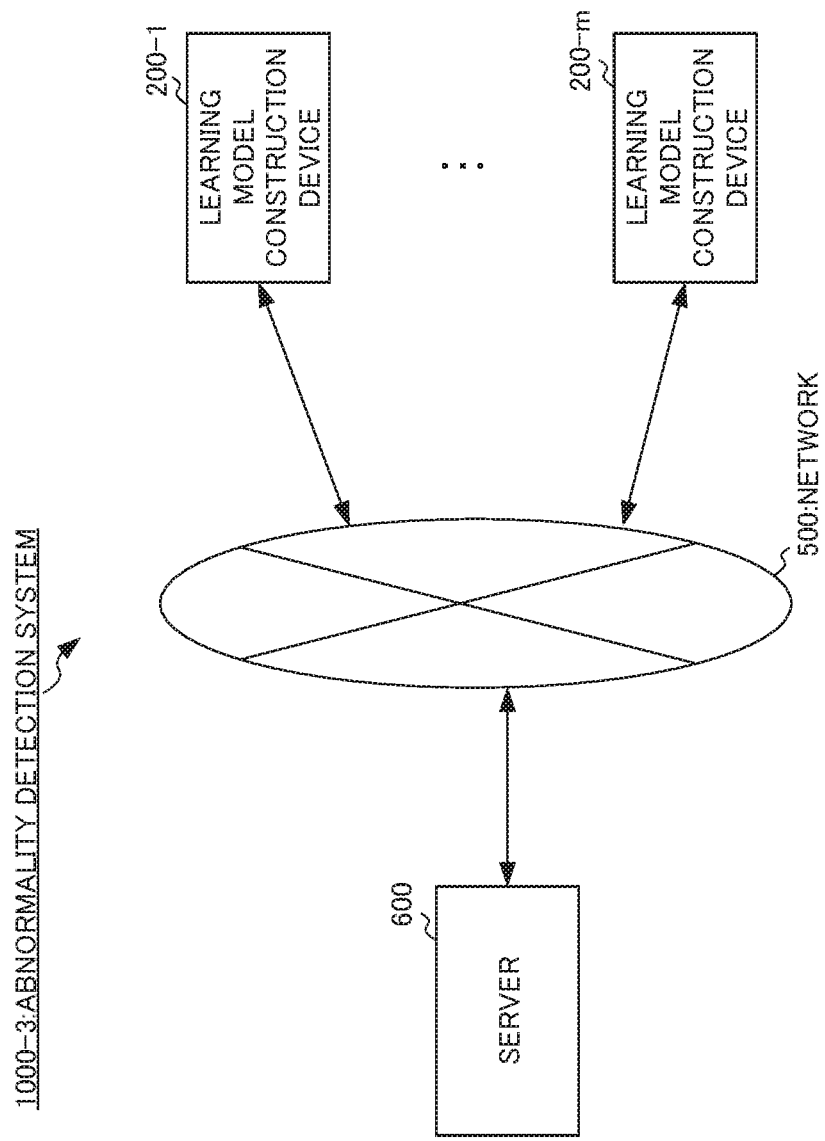
FIG. 7 is a block diagram showing learning model construction device interaction in a modified example of the present invention.

In addition, the aforementioned embodiments explain configurations in which the learning model construction device 200 constructs the learning model. In this regard, the abnormality detection system 1000-3 may be established as a system including a server 600 which is connected to m-number of learning model construction devices via a network 500, as shown in FIG. 7. For example, in the case of including a learning model construction device in every production line, m is the number of the production line. Then, by connecting the server 600 via the network 500 to the plurality of learning model construction devices 200-1 to 200-*m*, the server 600 can collect training data of each of the learning model construction devices 200. By configuring in this way, the server 600 can do learning using more training data than learning by each of the learning model construction devices 200, and can perform processing efficiently by employing the server 600 having high processing power. Then, it is possible to shorten the time for collecting several sets of training data. In addition, the server may be configured to play the role of sending and receiving data between the respective learning model construction devices. By configuring in this way, each of the learning model construction devices can perform learning using the training data of other learning model construction devices.

As yet another modified example, it may be configured so that the learning model construction device 200 and abnormality detection device 300 are realized as an integrated device. By establishing the learning model construction device 200 and abnormality detection device 300 as an integrated device, it is possible establish the hardware as one unit, as well as share the processing, and to achieve a cost reduction related to the system construction.

In addition, it may be configured so as to have the learning model construction device 200 and abnormality detection device 300 within the production apparatus. By configuring in this way, since it is possible to employ the hardware of the production apparatus, a further cost reduction related to system construction can be achieved.

It should be noted that each device included in the above-mentioned abnormality detection system can respectively be realized by hardware, software or a combination of these. In addition, the abnormality detection method performed by each device included in the above-mentioned abnormality detection system can also be realized by hardware, software or a combination of these. Herein, being realized by software indicates the matter of being realized by a computer reading out and executing programs.

The programs can be stored using various types of non-transitory computer readable media, and supplied to a computer. The non-transitory computer readable media includes tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber, or a wireless communication path.

EXPLANATION OF REFERENCE NUMERALS 100 mic
150 wearable terminal
200 learning model construction device
210 neighboring position determination unit
220 voice acquisition unit
230 label acquisition unit
240 learning unit
250 learning model storage unit
300, 2300 abnormality detection device
310 abnormality degree determination unit
320 notification unit
600 server
1000 abnormality detection system
2330 state data acquisition unit
2340 operating data acquisition unit
2350 data output unit

What is claimed is:

1. A learning model construction device comprising:
a non-transitory memory including an apparatus position storage that stored position information a production apparatus; and
a central processing unit (CPU) connected to the non-transitory memory,
wherein the CPU acquires position information of an operator,
wherein the CPU acquires, via a voice receiving device, voice data in a case of the operator being located in a vicinity of the production apparatus, based on the acquired position information of the operator and the position information of the production apparatus stored in the apparatus position storage,
wherein the CPU acquires an abnormality degree related to a production line including the production apparatus as a label,
wherein the CPU performs supervised learning with a group of the voice data and the label as training data, and
wherein the voice receiving device is wearable by the operator.

2. The learning model construction device according to claim 1,
wherein the CPU acquires a feature value obtained from the speech of the operator as the voice data.

3. The learning model construction device according to claim 2,
wherein the feature value is a value related to speech contents, tone interval and volume obtained by analyzing the speech of the operator.

4. An abnormality detection device configured using a learning model constructed by the learning model construction device according to claim 1, the abnormality detection device (i) determining an abnormality degree relative to the voice data, based on the acquired voice data and the learning model and (ii) performing notification based on the determined abnormality degree.

5. The abnormality detection device according to claim 4, wherein abnormality detection device (i) acquires state information related to the production line provided in the production line and (ii) outputs acquired the state information, in a case of the determined abnormality degree indicates an abnormality.

6. The abnormality detection device according to claim 5, wherein the state information includes at least any one of image information, oscillation information and temperature information.

7. The abnormality detection device according to claim 4, wherein the abnormality detection device (i) acquires operating information of the production apparatus and (ii) outputs the acquired operating information, in a case of the determined abnormality degree indicates an abnormality.

8. The abnormality detection device according to claim 7, wherein the operating information includes measurement data that was measured by a sensor installed in the production apparatus.

9. An abnormality detection system comprising:
the learning model construction device according to claim 1.

10. The abnormality detection system according to claim 9,
wherein the learning model construction device and the abnormality detection device are provided to the production apparatus.

11. A server having a plurality of the learning model construction devices according to claim 1, and connected to the plurality of the learning model construction devices via a communication network, the server (i) receiving training data consisting of a group of the acquired voice data and the acquired label of one of the learning model construction devices, and (ii) sending the received training data received to another of the learning model construction devices.

12. A server having a plurality of the learning model construction devices according to claim 1, and connected to the plurality of the learning model construction devices via a communication network, the server (i) receiving training data consisting of a group of the acquired voice data and the acquired label of each of the learning model construction devices, (ii) constructing a learning model for abnormality degree, by way of performing supervised learning using the received training data, and (iii) sending the constructed learning model to each of the learning model construction devices.

13. A learning model construction device comprising:
a non-transitory memory including an apparatus position storage that stored position information a production apparatus; and
a central processing unit (CPU) connected to the non-transitory memory,
wherein the CPU acquires position information of an operator,
wherein the CPU acquires voice data in a case of the operator being located in a vicinity of the production apparatus, based on the acquired position information of the operator and the position information of the production apparatus stored in the apparatus position storage,
wherein the CPU acquires an abnormality degree related to a production line including the production apparatus as a label, and
wherein the CPU performs supervised learning with a group of the voice data and the label as training data.

* * * * *